March 22, 1966  E. J. DIEBOLD  3,242,412
HIGH VOLTAGE RECTIFIER SYSTEMS
Filed July 24, 1961  3 Sheets-Sheet 1
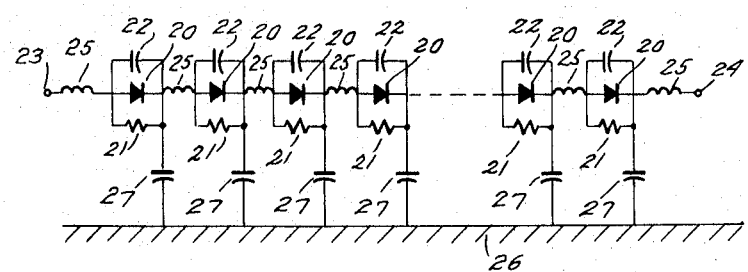
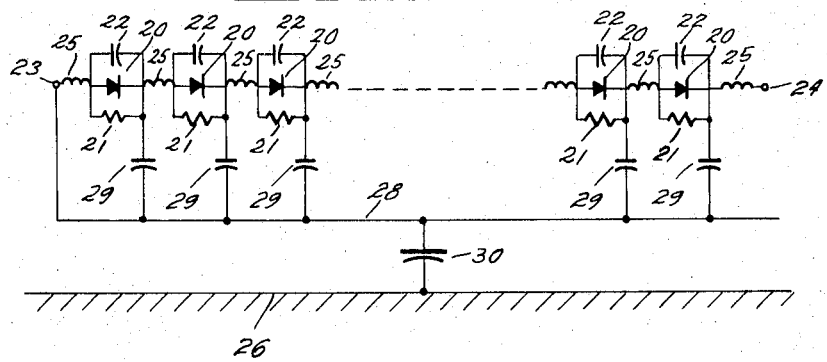
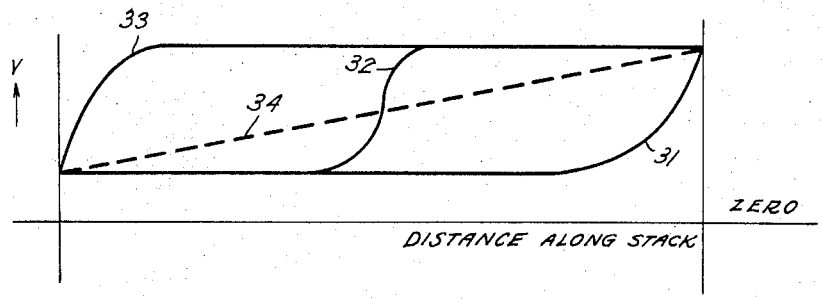
INVENTOR.
EDWARD J. DIEBOLD
BY
OSTROLENK, FABER, GERB & SOFFEN
ATTORNEYS

INVENTOR.
EDWARD J. DIEBOLD
BY OSTROLENK, FABER, GERB & SOFFEN
ATTORNEYS

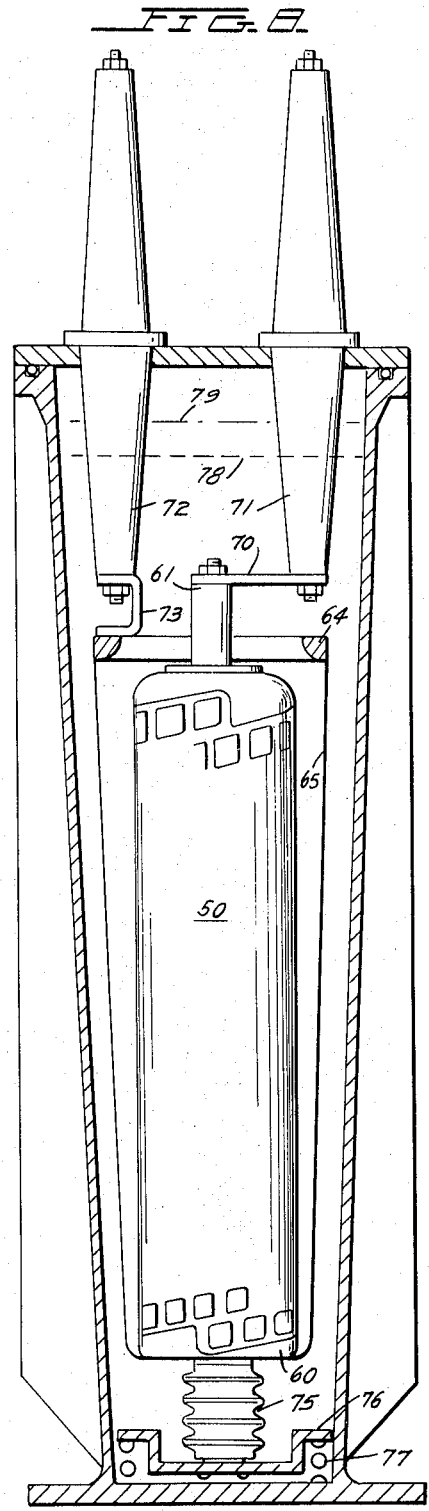
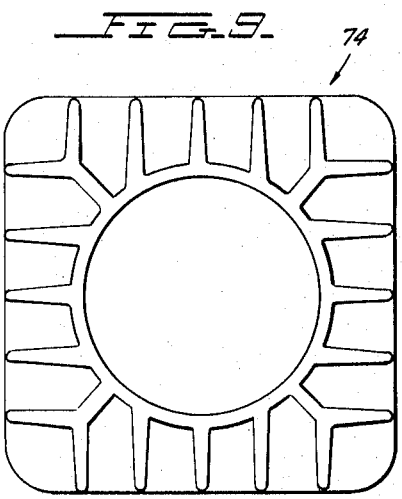
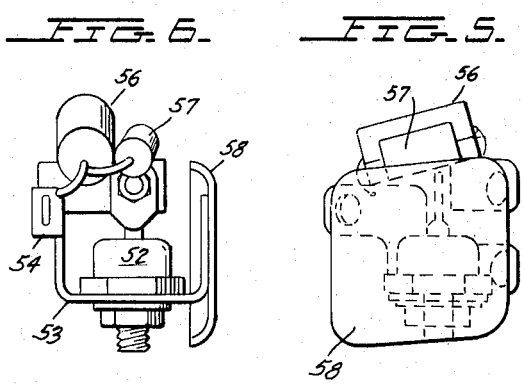
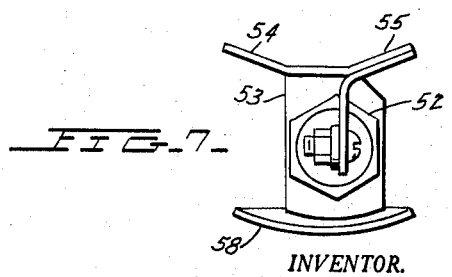
INVENTOR.
EDWARD J. DIEBOLD
BY
OSTROLENK, FABER, GERB & SOFFEN
ATTORNEYS

United States Patent Office 3,242,412
Patented Mar. 22, 1966

3,242,412
HIGH VOLTAGE RECTIFIER SYSTEMS
Edward J. Diebold, Palos Verdes Estates, Calif., assignor to International Rectifier Corporation, El Segundo, Calif., a corporation of California
Filed July 24, 1961, Ser. No. 126,182
17 Claims. (Cl. 321—11)

My invention relates to a high voltage rectifier system composed of a plurality of series connected rectifier cells of the type shown in my copending application Serial No. 34,191, filed June 6, 1960, now Patent No. 3,184,-646, entitled "High Voltage Rectifier Stack," and assigned to the assignee of the present invention, and more specifically relates to a high voltage rectifier stack having a Faraday shield therearound.

My above noted application describes a high voltage rectifier stack which could, for example, include several hundred series connected individual rectifier cells for defining a rectifier system which could supply voltages of the order of 10,000 to 100,000 volts at currents of the order of 1 to 50 amperes. Generally, my above noted application provides a tubular support of insulating material which has the individual rectifier cells assembled to the surface thereof along a helical path. Each of the individual rectifiers are contained within subassemblies which include the rectifier cell along with a shunt capacitor and resistor for purposes of voltage division for their respective rectifier within the stack, and a smooth conductive shield which covers the assembly.

The string of cells acts like a lumped constant delay line where voltages between the stack terminals having low rate are caused to divide between the rectifier cells by their parallel resistor, while high rate of rise voltages are balanced by the parallel capacitors. The resistors will also operate to damp the high frequency currents in the capacitor under high rate of rise voltage conditions. It has been found that when a voltage having a high rate of rise appears from one of the terminals of the essembly to ground, there have been unexpected failures of rectifier elements within the stack.

I have determined that the cause of these unexpected failures is due to the arbitrary distributed capacitance which couples the individual subassembly shields to ground, which appears inherently for each of the conductive members. Moreover, the individual inductances of each of the subassemblies are mutually coupled to one another so as to further complicate the action which occurs under high transient voltage faults between one of the terminals and ground.

I have discovered that by surrounding the rectifier stacks with a spaced shield of conductive material which has one end electrically connected to one end of the stack, I can substantially equalize the voltages appearing on the individual rectifier cells of the stack even under fault conditions which apply a high rising voltage between one of the terminals of the device to ground. This shield is insulated from ground and may be of a grid material to permit passage of a coolant.

Each of the individual rectifier assemblies are coupled to the shield by a defined distributed capacitance so that there will not be a fixed potential distribution from the indivdual elements to the shield. The shield itself is coupled to ground through a distributed capacitance that does not have to draw displacement current through the individual rectifier elements of the string. Accordingly, under fault conditions which apply a high rate of rise voltage between one of the stack terminals and ground, voltage distribution between the rectifiers will be determined according to the voltage between the stack terminals which, in turn, is determined by the parallel connected resistor-capacitor circuits for each of the cells.

Accordingly, with the use of the novel invention, the rectifier stack may be designed without taking into consideration those unknown and uncontrollable events which occur during transient voltage conditions to ground.

I have further recognized that where a high rate of rise of voltage is applied to one end of a stack of cells, those cells toward the open end will receive a proportionately higher voltage. To prevent breakdown of these end cells, and thus ultimate breakdown of the whole chain, I grade the rating of the cells of the string so that those nearest the open end of the stack have a higher voltage rating.

Accordingly, a primary object of this invention is to provide a novel high voltage, high power rectifier system.

Another object of this invention is to provide a novel high voltage, high power rectifier stack which includes a plurality of series connected rectifier cells which is surrounded by a Faraday shield.

A further object of this invention is to render a high voltage, high power rectifier stack independent of high rising voltages which occur between the terminals of the device to ground.

A further object of this invention is to provide a novel high voltage, high power rectifier system which has improved reliability.

Yet a further object of this invention is to provide a novel construction for a high voltage, high power rectifier stack which is renderd insensitive to fault conditions to ground.

Another object of this invention is to provide a string of series connected rectifier cells which have graded ratings.

These and other objects of this invention will become apparent from the following description when taken in connection with the drawings, in which:

FIGURE 1 schematically illustrates a high voltage, high power rectifier system of the type used in the prior art.

FIGURE 2 schematically illustrates the high voltage, high power rectifier system of FIGURE 1 in connection with a schematically illustrated Faraday shield.

FIGURE 3 illustrates the voltage distribution along the stack of FIGURE 1 for a high rising voltage between the cathode of the device and ground.

FIGURE 5 shows a front view of a typical rectifier module used in the rectifier assembly of FIGURE 4.

FIGURE 6 is a side view of the module of FIGURE 5.

FIGURE 7 is a top view of the module of FIGURE 5.

FIGURE 8 shows a side view partially in cross-section of a second embodiment of the invention.

FIGURE 9 is a cross-sectional view of the tank of FIGURE 8.

Figure 4:
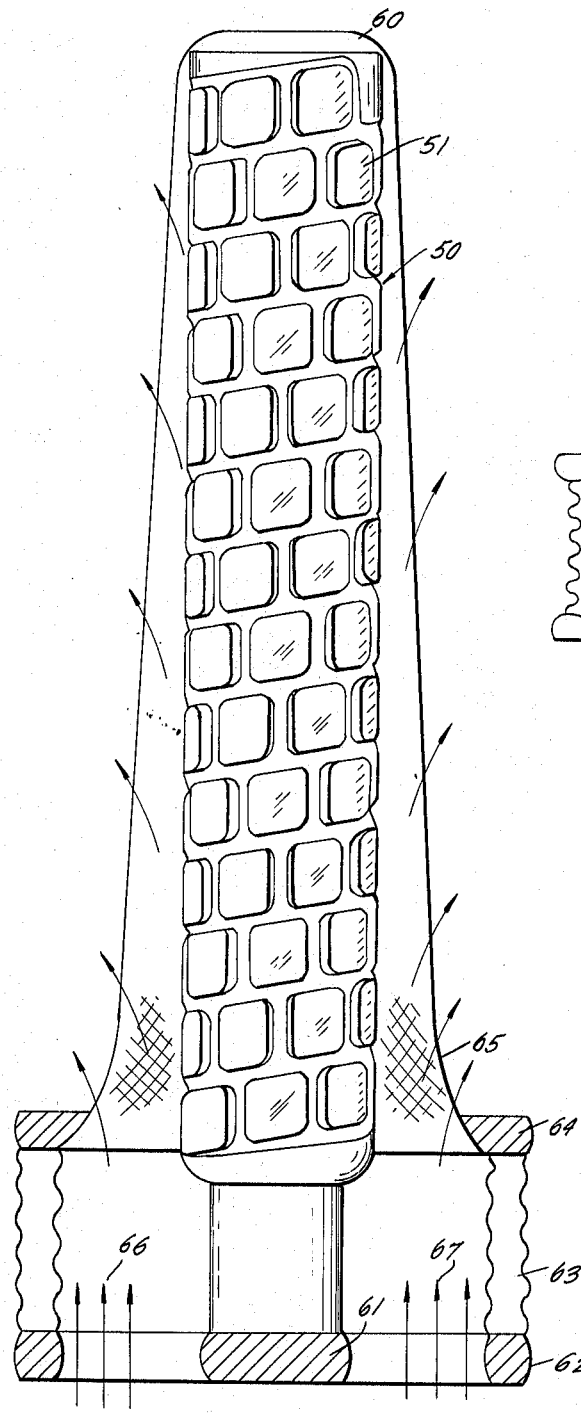
FIGURE 4 shows a side view partially in cross-section of a first embodiment of the invention.
Figure 10:
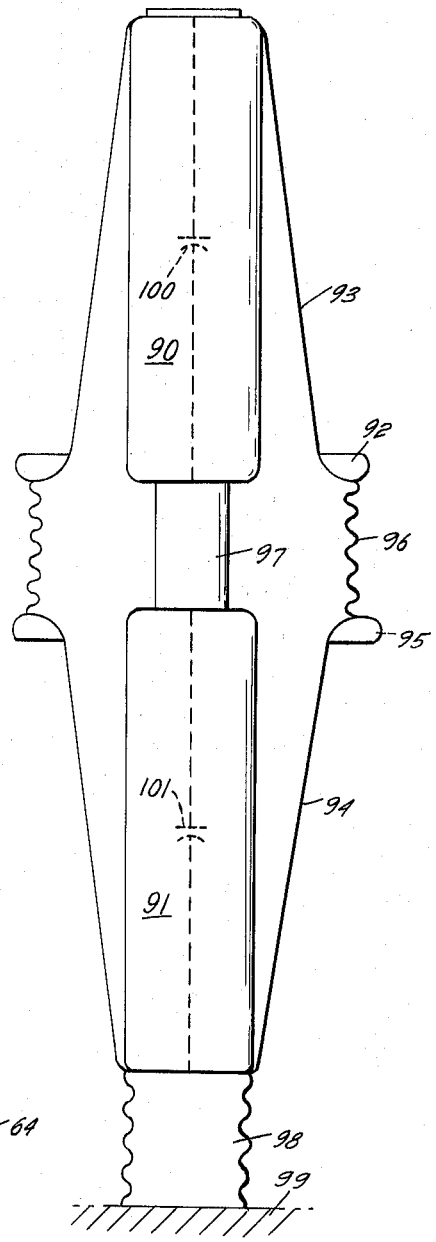

FIGURE 10 schematically illustrates the series connection of two stacks, each of the type shown in FIGURE 4.

Referring first to FIGURE 1, I have schematically illustrated a high voltage, high power rectifier stack of the type proposed in my above noted copending application Serial No. 34,191, now Patent No. 3,184,646. The rectifier stack is more specifically comprised of a plurality of rectifier cells 20 which have shunting resistors and capacitors 21 and 22 respectively.

The individual rectifier elements thus form a high voltage, high power system having anode terminal 23 and cathode terminal 24. It will also be noted that there is, inherently, inductance between the series connected cells, this being illustrated as inductors 25. Since any desired number of cells can be used in the system, I have shown a dotted line to indicate that only a portion of the cells are shown.

The device of FIGURE 1 is then supported in some typical manner with respect to a ground level of potential schematically illustrated as ground level 26.

Each of the individual rectifiers and their shunting resistors and capacitors are contained within a shield in a subassembly, and are connected to this ground level 26 by distributed capacitance illustrated as capacitors 27.

In the event that a voltage having a high rate of rise appears between terminals 23 and 24, the voltage will be appropriately divided between the series connected cells by their shunt capacitors 22. When, however, a fast-rising voltage is suddenly applied between either terminal 23 or terminal 24 to ground 26, the voltage division within the series connected string of rectifier devices 20 is mainly determined by the distributed capacitance 27 to ground for each of the cells. These distributed capacitances 27 will have the tendency to drag the center of the series connected string to ground potential rather than following the potential of the terminals 23 and 24.

Note that if no capacitance to ground were present, the center of the string of series connected rectifier cells 20 would follow a voltage distribution given by the internal impedances of shunt capacitors 22, resistors 21, and the inductances 25. However, when the distributed capacitances are taken into account, when a high voltage rectifier system is subjected to sudden and unknown voltage surges between the system and ground, unknown and uncontrollable voltage distribution will occur across the individual rectifier cells since the rectifier string must supply the charging currents through the various distributed capacitances. It is, therefore, possible that a voltage sufficient to break down one or more of the individual rectifier cells can appear across some of the rectifier cells to cause it to fail and thus set up a possible progressive failure throughout the system until each of the cells have failed.

In accordance with the present invention, and as is illustrated in FIGURE 2, a Faraday shield to be more fully described hereinafter and schematically illustrated by the common conductor 28, is provided for each of the individual rectifiers and their associated shunting resistors and capacitances. Thus, in FIGURE 2, each of the individual groups are coupled to shield 28 by their distributed capacitance schematically illustrated by capacitors 29, while the shield 28 is coupled to ground by its distributed capacitance 30.

The capacitors 29 are formed, primarily, by the shield of each of the individual rectifier assemblies which serve as a first electrode, and the screen 28 which serves as a common electrode for all of the individual capacitances. One end of the shield 28 is then connected to the anode terminal 23. Accordingly, in the system of FIGURE 2, any sudden fast-rising voltage wave front applied to terminal 23 to ground 26 will cause a discharge current to flow directly through capacitance 30 without affecting the capacitances 29 between the string of cells and the screen 28.

If, on the other hand, a sudden fast-rising voltage is applied between terminal 24 and ground 26, the voltage distribution along the individual coupling capacitors 29 will be determined only by the voltage difference between terminals 23 and 24, rather than by the voltage between terminal 24 and ground 26. That is to say, in the system of FIGURE 2, the charging current through these distributed capacitances 29 will be supplied by the electrical conductors connected to terminals of the rectifier string, rather than by the string of rectifiers themselves.

Generally, the impedance of the overall system applying energy to terminals 23 and 24 will be very low as compared to the impedance of the distributed capacitances 29, so that the voltage distribution between terminal 23 or 24 and ground will not be greatly affected by these distributed capacitances. Thus, the string of rectifiers can now be designed for operation only in connection with voltages which would appear between the terminals 23 and 24 of the rectifier string, and the problem of designing for unknown and uncontrollable events of the type which exist when there is a fault from one of the terminals to ground, is eliminated as a design consideration for the rectifier stack.

As pointed out above, the equivalent diagram of the stack shown in FIGURES 1 and 2 includes inductances 25 between each of the rectifier cells. It has been found under test conditions that these inductances, in conjunction with the distributed capacitances 27 or 29 to ground, cause exceedingly complex oscillatory voltage distribution patterns along the rectifier stack. It has commonly been thought that by grading the capacitances 22 in a system not using a Faraday shield, in accordance with the present invention, the effect of these oscillatory voltages will be eliminated.

I have, however, found that since the inductances 25 are not pure self-inductances, but also exhibit substantial mutual inductance, when the stack is subjected to different voltage transient shapes, the voltage distribution can be entirely different than expected and can assume a voltage distribution shown, for example, in FIGURE 3.

In FIGURE 3, I show the effects of a travelling wave of voltage plotted in terms of voltage magnitude as a function of distance of the wave along the stack. Thus, when a suddenly rising voltage is applied to terminal 24 of the system of FIGURE 1, the voltage distribution along the length of the stack will initially be that shown in curve 31 in FIGURE 3. From curve 31 it will be apparent that those rectifier elements closest to terminal 24 will bear the largest portion of the transient voltage between terminal 24 and ground. At a later time, the voltage wave progresses along the stack to curve 32 so that those rectifier elements existing in the center of the stack are subjected to a very sudden voltage rise which could be sufficient to damage these center rectifier elements.

Finally, the voltage wave arrives at the end of the stack, as illustrated by curve 33, whereupon the voltage wave is reflected, and finally balances out the voltage difference between terminals 23 and 24 to the straight dotted line 34.

It can be shown that, depending upon the magnitude of the mutual inductance between inductances 25, the shunt capacitance 22, and capacitance to ground 27, the transmission of waves along the stack will be affected by the shape of the applied voltage as it increases as a function of time. Therefore, the method of equalizing voltage distribution by graded capacitance in a system of the type of FIGURE 1, will not be of any substantial effect. Its only effect is apparent during slow-rising voltages which would not normally damage the rectifier stack, although this would be true even in no shunt capacitance grading were used.

The concept of grading the capacitors, however, becomes of substantial effect when used in combination with my novel Faraday screen 28 of FIGURE 2. Thus, in FIGURE 2, it is apparent that the voltage between the screen 28 and terminal 23 will always be zero so that voltage distribution in the vicinity of terminal 23 will never be a particular problem. The voltage distribution along the rectifier stack and in the vicinity of terminal 24 will only depend upon the voltage between terminal 23 and 24 which will be mainly influenced by the distributed capacitance shown by capacitors 29. If the capacitance of capacitors 29 is held low in the vicinity of terminal 24 and high in the vicinity of terminal 23, the displacement current which must be carried by the series inductors 25 in the vicinity of terminal 24, will be small.

Accordingly, a voltage surge appearing between terminals 23 and 24 will cause a voltage wave which decreases as it progresses along the stack, gradually being absorbed by increasing values of capacitance.

Thus, it is seen that by appropriately grading capacitances 29 in the system of FIGURE 2, a substantial corrective action is achieved.

In further combination with this capacitance grading, it is also desirable that the voltage rating of those rectifiers closest to terminal 24 be somewhat larger than the rating of the rectifiers further removed from terminal 24 since higher voltages will be applied to these rectifiers under fault conditions.

A typical rectifier stack which meets all of the conditions of FIGURE 2 is shown in FIGURE 4. Thus, in FIGURE 4, a rectifier assembly 50 is, as shown in my copending application Serial No. 34,191, filed June 6, 1960, now Patent No. 3,184,646, entitled "High Voltage Rectifier Stack," and assigned to the assignee of the present invention, formed of a plurality of rectifier containing sub-assemblies such as sub-assembly 51 which are mounted along a helical path on an insulating cylinder tube. For details of this construction, reference is made to the above noted application Serial No. 34,191, now Patent No. 3,184,646.

The individual sub-assemblies or modules such as module 51 is shown, for example, in FIGURES 5, 6 and 7, and is comprised of a rectifier element 52 mounted to a support bracket 53. The support bracket 53 is provided with extending ears 54 and 55 which are connectable to the essential insulating tube column, and, at the same time, permit electrical connection of diode 52 to the diodes of the adjacent modules.

The module further carries the balancing capacitor 56 and resistor 57, and the bracket 53 is terminated by an external conductive shield 58. It is the shield such as shield 58 which is seen for the modules of the system of FIGURE 4 whereby a smooth, continuous electrode-type surface is provided.

The upper end of the stack of FIGURE 4 is then terminated by an electrode 60 which can receive a first terminal of the rectifier stack, while the bottom of the stack is provided with a downwardly extending conductive terminal 61 which receives the other terminal of the system. The stack is supported by a conductive ring 62 which has a hollow insulator 63 thereon, as illustrated. The upper end of hollow insulator 63 receives a conductive ring 64 which has the outwardly flared lower end of a conically shaped expanded metal mesh 65 which could be, for example, a copper screen.

The screen 65 then extends upwardly in spaced relation with respect to stack 50, and terminates at its upper end by electrical connection to terminal 60. The screen 65 forms the Faraday shield, in accordance with the invention.

The shield 65 is formed of a mesh so that forced air cooling can be provided whereby the coolant enters the assembly, as illustrated by arrows 66 and 67, and leaves the assembly through the screen 65, as illustrated by the arrows leaving the screen.

Because of the effect of the Faraday screen 65 as indicated above, any sudden voltage change between terminals 60 and 61 and a remotely positioned ground potential, will only affect the charging current between screen 65 and ground, but cannot influence the voltage between the screen 65 and any of the individual rectifier devices such as device 51 of stack 50.

A second embodiment of the invention is shown in FIGURES 8 and 9 which show a rectifier stack such as rectifier stack 50 of FIGURE 4 as modified for mounting in a metallic tank which is filled with oil. Thus, in FIGURE 8 stack 50 is shown reversed from its position of FIGURE 4 with upper terminal 61 being connected to conductive strap 70 which is, in turn connected to an insulating bushing 71.

The conductive ring 64 is then electrically connected to a second insulator bushing 72 by means of a jumper 73.

The bushings 71 and 72 pass through the top of a metallic tank 74 which, as illustrated in FIGURE 9, is provided with a ribbed construction to increase its external surface area accessible to cooling. The bottom of the insulator stack 50 in FIGURE 8 rests on an insulator 75, the bottom of which is received in a conductive cup 76 which is biased upwardly by a biasing spring 77.

The tank 74 is then filled with an appropriate insulation oil to a level indicated by dotted line 78, which oil is expandable to the upper dot-dash line 79 under increased temperature conditions.

Since in high voltage systems of this type it is common to have both terminals 60 and 61 at relatively high voltages above ground where the tank 74 is at ground potential, the voltage between the individual rectifier devices of stack 50 and the tank wall would normally be very high. In accordance with the present invention, however, the screen 65 is interposed between the tank wall and the rectifier stack, whereby the high voltage between the stack 50 and ground has no effect on the voltage distribution along the stack, so that one of the major causes of failure in such systems is eliminated.

Where even higher voltages are required, two stacks 90 and 91 can be connected in series, as illustrated in FIGURE 10 where each of stacks 90 and 91 could, for example, be identical in construction to the system of FIGURE 4. However, it will be apparent that it is necessary to have the polarities of the rectifiers of one of the stacks reversed with respect to the other stack so that the polarities of all of the stacks are identical.

The upper stack 90 has a conductive ring 92 which receives one end of Faraday screen 93, the other end of which is connected to the upper terminal of stack 90. In a similar manner, stack 91 is provided with a Faraday shield 94 which is connected to a conductive ring 95 at its upper end and to the lower terminal of stack 91 at its lower end. The two conductive rings 92 and 95 are then spaced from one another by the schematically illustrated insulating means 96, and the adjacent terminals of stacks 90 and 91 are directly connected to one another by a conductive member 97. The lower end of stack 91 is then connected to a support insulator 98 which is supported from a base 99 which could be the floor of a building.

The arrangement of FIGURE 10 is advantageous in that all external voltages applied between the upper terminal of stack 90 and the lower terminal of stack 91 are also applied to screens 42 and 43. Because of the symmetry of the stack, the capacitive coupling and the series inductance of the stack, this voltage will be immediately subdivided in half with respect to the voltage between ring 92 and conductor 97. This equal subdivision of voltages between the stacks and the use of screens 93 and 94 to help attenuate the travelling voltage waves along the stacks provides highly improved performance for the system. Moreover, the substantial capacitance between screens 93 and 94 considerably limits the possible rate of rise of voltage transients between the upper and lower terminals of the system, without directly affecting the voltages along stacks 90 and 91.

If desired, and as is additionally shown in FIGURE 10, each of the devices 90 and 91 may have respective high voltage capacitors 100 and 101 (shown in dotted lines) connected thereacross. For example, capacitors 100 and 101 are high voltage tubular capacitors supported within the hollow insulation support tube for each of the rectifier assemblies.

The provision of such capacitors permits a substantial decrease in the size of the individual shunting capacitors for the individual rectifiers. Thus, it can be shown that where each rectifier assembly has N devices, and thus N shunting capacitors, for 2N devices in series, $C_s > C_g(2N)^2$ where $C_s$ is the shunting capacitor value and $C_g$ is the capacitance of each device to the screen. By adding capacitors such as capacitors 101, which have a value $C_1$, $C_s > C_g N^2$ while $C_1 > 4C_T$ where $C_T$ is the capacitance of the complete device to its ambient. Thus, $C_1$ can be a very small value, while the value of the shunt capacitors $C_s$ has been decreased to one-fourth of their former value.

In the foregoing, I have illustrated the screen as being a wire mesh type of screen. This is primarily done to permit the passage of a coolant. Clearly, however, the screens could be replaced as by an insulating cylinder having a metallized internal surface to provide a resistive screen which can be terminated on both sides to the terminal of the rectifier stack.

Where an equal resistive voltage division can be achieved in this manner, it will be seen that the transient voltage distribution of the stack will be assisted.

Although I have described preferred embodiments of my novel invention, many variations and modifications will now be obvious to those skilled in the art, and I prefer therefore to be limited not by the specific disclosure herein but only by the appended claims.

I claim:

1. In a high voltage rectifier system; said high voltage rectifier system including a plurality of rectifier elements connected in series, and support means for physically supporting said plurality of rectifiers and maintaining said rectifiers spaced from one another; said series connected plurality of rectifier elements being terminated by first and second terminals; a Faraday shield; said Faraday shield surrounding said plurality of rectifiers; said Faraday shield being electrically connected to one of said terminals.

2. In a high voltage rectifier system; said high voltage rectifier system including a plurality of rectifier elements connected in series, and support means for physically supporting said plurality of rectifiers and maintaining said rectifiers spaced from one another; said series connected plurality of rectifier elements being terminated by first and second terminals; a Faraday shield; said Faraday shield surrounding said plurality of rectifiers; said Faraday shield being electrically connected to one of said terminals; said rectifiers being mounted along a helical line surrounding a cylindrical insulator support forming said support means.

3. In a high voltage rectifier system; said high voltage rectifier system including a plurality of rectifier elements connected in series, and support means for physically supporting said plurality of rectifiers and maintaining said rectifiers spaced from one another; said series connected plurality of rectifier elements being terminated by first and second terminals; a Faraday shield; said Faraday shield surrounding said plurality of rectifiers; said Faraday shield being electrically connected to one of said terminals; said Faraday shield being porous to pass a coolant.

4. In a high voltage rectifier system; said high voltage rectifier system including a plurality of rectifier elements connected in series, and support means for physically supporting said plurality of rectifiers and maintaining said rectifiers spaced from one another; said series connected plurality of rectifier elements being terminated by first and second terminals; a Faraday shield; said Faraday shield surrounding said plurality of rectifiers; said Faraday shield being electrically connected to one of said terminals; each of said rectifiers having a respective external conductive shield; said external conductive shields facing said Faraday shield.

5. In a high voltage rectifier system; said high voltage rectifier system including a plurality of rectifier elements connected in series, and support means for physically supporting said plurality of rectifiers and maintaining said rectifiers spaced from one another; said series connected plurality of rectifier elements being terminated by first and second terminals; a Faraday shield; said Faraday shield surrounding said plurality of rectifiers; said Faraday shield being electrically connected to one of said terminals; each of said rectifiers having a respective parallel connected capacitor; said rectifier being graded in rating from one end of said series connected rectifiers to the other end of said series connected rectifiers in a predetermined manner.

6. In a high voltage rectifier system; said high voltage rectifier system including a plurality of rectifier elements connected in series, and support means for physically supporting said plurality of rectifiers and maintaining said rectifiers spaced from one another; said series connected plurality of rectifier elements being terminated by first and second terminals; a Faraday shield; said Faraday shield surrounding said plurality of rectifiers; said Faraday shield being electrically connected to one of said terminals; each of said rectifiers having a respective external conductive shield; said external conductive shields facing said Faraday shield; said rectifiers being mounted along a helical line surrounding a cylindrical insulator support forming said support means.

7. In a high voltage rectifier system; said high voltage rectifier system including a plurality of rectifier elements connected in series, and support means for physically supporting said plurality of rectifiers and maintaining said rectifiers spaced from one another; said series connected plurality of rectifier elements being terminated by first and second terminals; a Faraday shield; said Faraday shield surrounding said plurality of rectifiers; said Faraday shield being electrically connected to one of said terminals; each of said rectifiers having a respective external conductive shield; said external conductive shields facing said Faraday shield; said Faraday shield being porous to pass a coolant.

8. In combination; a string of series connected rectifiers extending from one terminal to a second terminal, and a Faraday shield; said Faraday shield being connected to one of said terminals; said Faraday shield surrounding said string of series connected rectifiers.

9. In combination; a string of series connected rectifiers extending from one terminal to a second terminal, and a Faraday shield; said Faraday shield being connected to one of said terminals; said Faraday shield surrounding said string of series connected rectifiers; said Faraday shield being porous to pass a coolant.

10. In combination; a string of series connected rectifiers extending from one terminal to a second terminal, and a Faraday shield; said Faraday shield being connected to one of said terminals; said Faraday shield surrounding said string of series connected rectifiers; each of said rectifiers having a respective capacitor and resistor connected in parallel therewith.

11. In combination; a string of series connected rectifiers extending from one terminal to a second terminal, and a Faraday shield; said Faraday shield being connected to one of said terminals; said Faraday shield surrounding said string of series connected rectifiers; said rectifiers having fixed respective distributed capacitances with respect to said shield; said shield having a fixed distributed capacitance to external areas at a potential different from the potential of said first terminal.

12. In combination; a string of series connected rectifiers extending from one terminal to a second terminal, and a Faraday shield; said Faraday shield being connected to one of said terminals; said Faraday shield surrounding said string of series connected recetifiers; each of said rectifiers having a respective capacitor and resistor connected in parallel therewith; said rectifiers having fixed respective distributed capacitances with respect to said shield; said shield having a fixed distributed capacitance to external areas at a potential different from the potential of said first terminal.

13. In combination; a string of series connected rectifiers extending from one terminal to a second terminal, and a Faraday shield; said Faraday shield being connected to one of said terminals; said Faraday shield surrounding said string of series connected rectifiers; and mounting means for mounting said rectifiers in fixed spaced relation with respect to one another.

14. In combination; a string of series connected rectifiers extending from one terminal to a second terminal, and a Faraday shield; said Faraday shield being connected to one of said terminals; said Faraday shield surrounding said string of series connected rectifiers; and mounting means for mounting said rectifiers in fixed spaced relation with respect to one another; said mounting means comprising an insulation tube; said rectifiers being disposed on said tube around the path of a helix.

15. In combination; a string of series connected rectifiers extending from one terminal to a second terminal, and a Faraday shield; said Faraday shield being connected to one of said terminals; said Faraday shield surrounds said string of series connected rectifiers; each of said rectifiers having a respective capacitor and resistor connected in parallel therewith; each of said rectifier, and its respective resistors and capacitors being mounted in a subassembly including a conductive shield; said conductive shield facing said Faraday shield.

16. In combination a first rectifier assembly and a second rectifier assembly; said first and second rectifier assemblies being connected in series; each of said first and second rectifier assemblies comprising a string of series connected rectifiers extending from a first terminal of their respective assembly to a second terminal of their respective assembly; and a Faraday shield for each of said assemblies; each of said Faraday shields being connected to said one terminal of its said respective assembly; each of said Faraday shields surrounding its said respective string of series connected rectifiers; each of said rectifiers having a respective capacitor connected in parallel therewith.

17. In combination a first rectifier assembly and a second rectifier assembly; said first and second rectifier assemblies being connected in series; each of said first and second rectifier assemblies comprising a string of series connected rectifiers extending from a first terminal of their respective assembly to a second terminal of their respective assembly; and a Faraday shield for each of said assemblies; each of said Faraday shields being connected to said one terminal of its said respective assembly; each of said Faraday shields surrounding its said respective string of series connected rectifiers; each of said rectifiers having a respective capacitor connected in parallel therewith; each of said rectifier assemblies having a respective shunt capacitor connected between said one terminal and said second terminal of each of said respective rectifier assemblies.

References Cited by the Examiner

UNITED STATES PATENTS

| 1,842,716 | 1/1932 | De Ferranti | 317—234 |
| 1,907,633 | 5/1933 | Westermann | 174—143 |
| 2,357,858 | 9/1944 | Trees et al. | 174—73 |
| 2,984,773 | 5/1961 | Guldemond et al. | 317—234 |
| 3,123,760 | 3/1964 | Wouk et al. | 321—11 |

FOREIGN PATENTS

| 681,911 | 3/1964 | Canada. |

LLOYD McCOLLUM, *Primary Examiner.*

SAMUEL BERNSTEIN, *Examiner.*